Oct. 10, 1967

R. S. SUTTON 3,346,771

DIGITAL ELECTRONIC SPEED CONTROL GOVERNOR UTILIZING
PULSE WIDTH COMPARISON

Filed Oct. 27, 1964

INVENTOR.
ROBERT S. SUTTON.

BY *Barthel & Bugbee*

ATTORNEYS

INVENTOR
ROBERT S. SUTTON

BY Barthel + Bugbee
ATTORNEYS

United States Patent Office 3,346,771
Patented Oct. 10, 1967

3,346,771
DIGITAL ELECTRONIC SPEED CONTROL GOVERNOR UTILIZING PULSE WIDTH COMPARISON
Robert S. Sutton, Grosse Pointe Farms, Mich.
(26091 German Mill Road, Franklin, Mich. 48025)
Filed Oct. 27, 1964, Ser. No. 406,754
9 Claims. (Cl. 317—5)

ABSTRACT OF THE DISCLOSURE

A constant speed is accurately maintained within extremely narrow limits, for example, the rotational speed of an internal combustion engine or the rate of flow of a liquid through a pipe by providing a digital electronic governor of great sensitivity and responsiveness and rapidity of action, which provides a feedback loop in any electrical and/or mechanical system which needs control.

---

Figure 1:
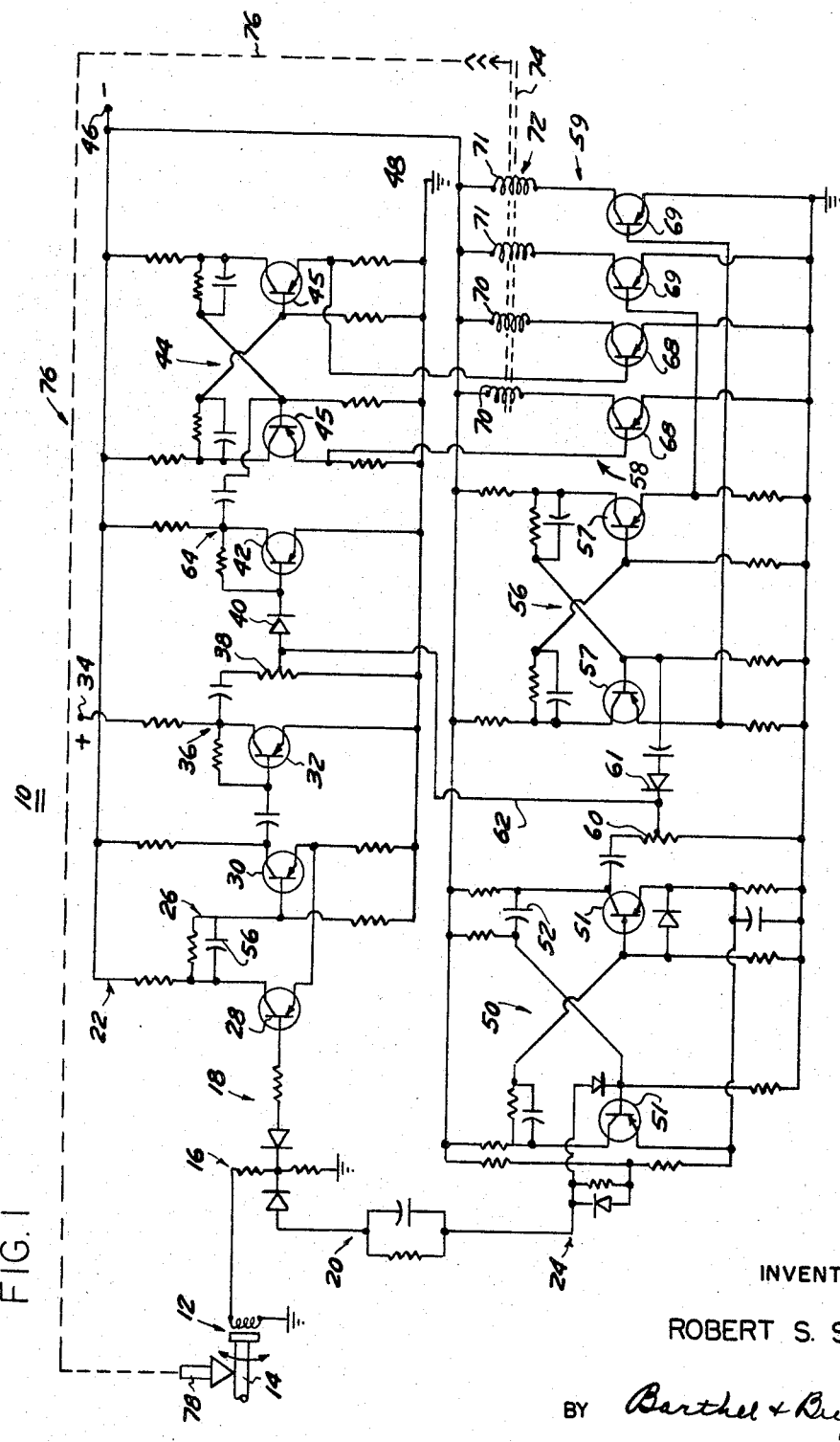

This digital electronic speed control governor includes a sensor or pickup adjacent or connected to the machine or device to be controlled, the sensor emitting electronic pulses which are diverted into two branch circuits connected in parallel relatively to one another. Each pulse reaching the first branch circuit is converted into a square wave of variable width by a trigger subcircuit and its phase inverted, so that the width of the square wave thus produced varies with the variation of speed of the machine or device controlled. For each pulse reaching the first branch circuit, another pulse simultaneously reaches the second branch circuit and is there converted into a square wave of constant width, the square wave of variable width being compared and combined algebraically with the simultaneously-generated square wave of constant width and opposite phase synchronized therewith, so that the resultant "spike" representing the difference between the widths of the two waves may be positive, negative or zero, corresponding respectively to a speed which is too low, too high or correct. This resultant "spike" is fed into a circuit which converts it into a mechanical motion in one direction or the other, such as by the use of a stepping motor which in turn controls the speed regulator in a feedback manner such as, for example, controlling the opening or closing of an internal combustion engine throttle or turning the valve member of a liquid flow control valve.

In particular, the electronic pulse emitted by the sensor or pickup simultaneously energizes a Schmitt trigger circuit in the first branch circuit and a monostable multivibrator circuit in the second branch circuit, the width of the square wave in the output from the Schmitt trigger circuit being variable as a function of the actual engine speed, whereas the width of the square wave from the multivibrator circuit is constant as a function of the desired constant engine speed, the algebraic combining of the two square waves giving either a positive or negative value which operates an increment motor in one direction or the other to control the position of the engine throttle or the position of the liquid flow control valve, as the case may be.

This digital electronic governor can be used to control random events yet remain dormant until the occurrence of such an event which generates a pulse representing such event, whereupon the trigger circuit springs into action and the governor functions instantly to apply any control necessary concerning the event.

The operation of this digital electronic governor is completely independent of the amplitude or frequency of the pulse generated by the sensor or pickup and, in contrast, is solely a function of the duration of the pulse coming from the sensor-emitter.

Summary of the invention

In general, the digital electronic speed control governor of the present invention employs a sensor or pickup which creates an electronic pulse, this in turn being fed into a voltage divider, one branch of which is connected to a Schmitt trigger which generates a square wave, the width of which varies with the variation of the duration of the sensor-created pulse, and thence into a first flip-flop circuit. The other branch leads to a monostable multivibrator circuit which generates a square wave of constant width, and thence into a second flip-flop circuit. The variable width of the square wave in the output from the Schmitt trigger emerging from the first flip-flop circuit is compared and algebraically combined with the output from the monostable multivibrator circuit emerging from the second flip-flop circuit, and the result is fed into a stepping motor which rotates in one direction or the other, depending upon whether the width of the square wave from the Schmitt trigger circuit is broader or narrower than the constant width square wave emerging from the monostable multivibrator circuit. The stepping motor in turn is mechanically connected to the member which, when controlled, varies the speed of the member which effects generation of the electronic pulse in the sensor-emitter. The square waves of both the Schmitt trigger circuit and the monostable multivibrator circuit are necessarily in synchronism since they are both produced simultaneously from the same pulse emitted from a common sensor or pickup which serves as a pulse emitter.

Specifically, the digital electronic speed control governor of the present invention was designed to hold the speed of an internal combustion engine at 3600 r.p.m. plus or minus 10 r.p.m., between full load and no load conditions, so that a generator connected to the engine output and operating at a frequency of 60 cycles per second at 120 volts would maintain this frequency within one cycle per second and the voltage within two volts. Should the frequency and/or voltage drop to these limits with the application of full load, the governor is intended to return them to the steady state within one second of time, unless a slightly greater time lag were introduced by the inertia of the moving parts of the engine.

Figure 2:
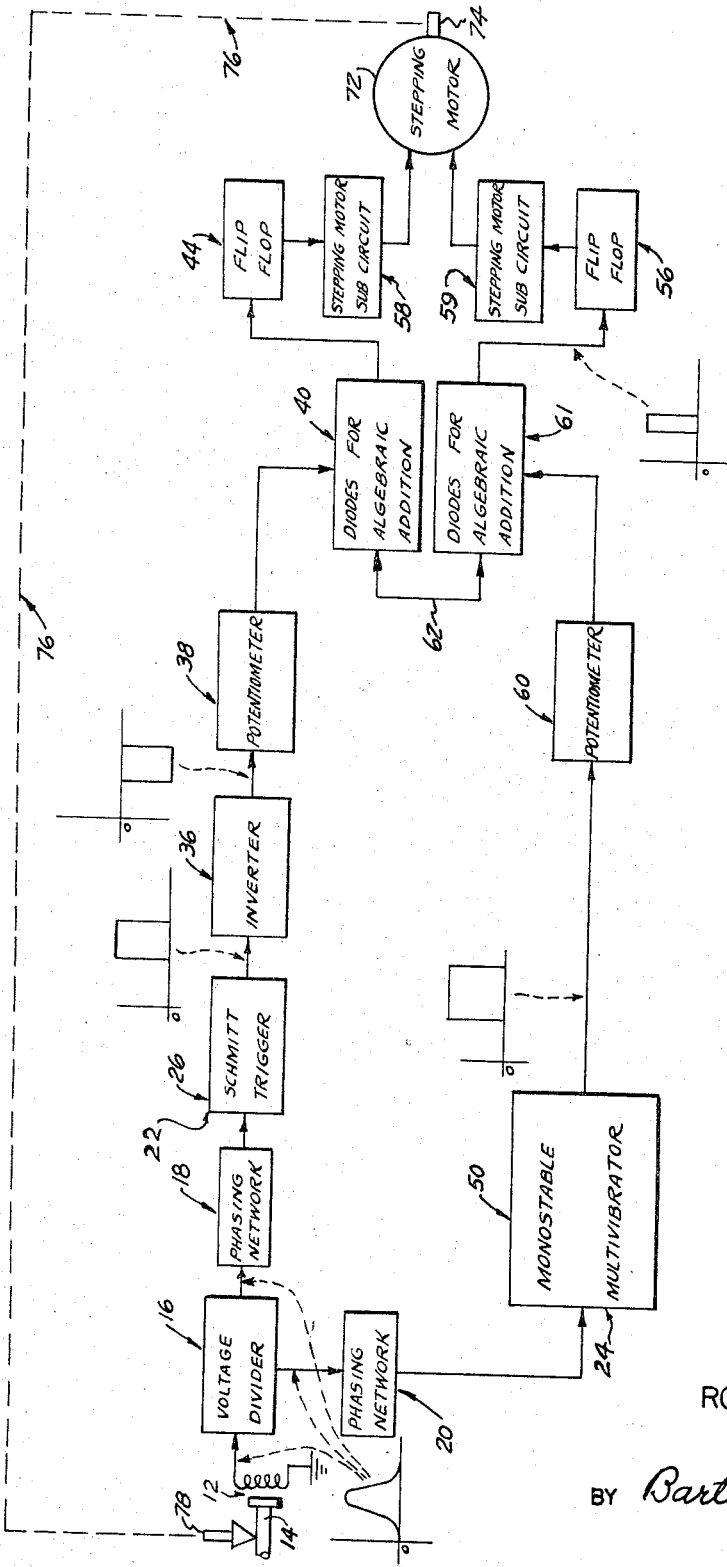

In the drawings, FIGURE 1 is a schematic wiring diagram of a digital electronic speed control governor, according to one form of the invention; and FIGURE 2 is a block diagram thereof.

Referring to the drawing in detail, FIGURES 1 and 2 show a digital electronic speed control governor, generally designated 10, the circuit of which includes a sensor or pulse emitter 12 connected to and disposed adjacent a moving member 14, such as the crankshaft of an internal combustion engine, the speed of which is to be controlled in the manner set worth above. Each pulse emitted by the sensor 12 is fed to a voltage divider 16 whence it divides and passes either through a first diode and phasing network 18, or into a second diode and phasing network 20 leading respectively into a variable width square wave branch circuit, generally designated 22 or a constant width square wave branch circuit, generally designated 24. The variable width square wave branch circuit 22 includes a Schmitt trigger subcircuit 26 including a first 2N1307 transistor 28, the base of which receives pulses from the first diode and phasing network 18. The Schmitt trigger subcircuit 26 is of a conventional type in itself and is shown, for example, on page 122, Figure 11.14(A) of the General Electric Transistor Manual, Fifth Edition, published in 1960 by the General Electric Company, and includes a second 2N1307 transistor 30.

The Schmitt trigger subcircuit 26 converts the trigger pulse to a square wave and passes it onward to the base of a third transistor 32, namely a 2N1306 transistor, the collector of which is connected to a positive 12-volt current supply source 34 which converts the negative square waves from the Schmitt trigger subcircuit 26 to positive square waves.

Beyond and connected to the third transistor 32, which forms part of an inverter subcircuit 36 is a one megohm potentiometer 38 which in turn is connected through a diode 40 and a fourth transistor 42, which is another 2N1307 transistor, to a first saturated flip-flop circuit, generally designated 44, containing two 2N1307 transistors 45. The branch circuit 22 terminates in a minus 12-volt connection terminal 46 and a ground connection 48.

The constant width square wave branch circuit 24 receives pulses by way of the second diode and phasing network 20 and feeds them to a monostable multivibrator subcircuit, generally designated 50, containing two 2N1307 transistors 51 and of the type shown on page 124, Figure 11.16(A) of the above-named General Electric Transistor Manual, which converts the pulses received therefrom to a train of negative square wave pulses of constant width, whose width is determined by the value of the capacitor 52.

Beyond the monostable multivibrator subcircuit 50 is a second saturated flip-flop subcircuit, generally designated 56, also containing two 2N1307 transistors 57, and beyond this are two stepping motor subcircuits, generally designated 58 and 59 each containing a pair of 2N250 transistors 68 and 69 respectively, and discussed more fully below. The two saturated flip-flop circuits 44 and 56 are also of a conventional type shown on page 107, Figure 11.1(C) of the same General Electric Transistor Manual, which is modified to handle the power from the motor, which the saturated flip-flop circuit of Figure 11.1(C), as it stands, is incapable of doing.

The output variable width square wave from the inverter 36 and from the one megohm potentiometer 38 and the output constant width square wave from a similar one megohm potentiometer 60 receiving the input of the monostable multivibrator 50 are combined and algebraically added through a connecting line 62. Since the leading edges of the variable width square wave in the branch circuit 22 and the constant width square wave in the branch circuit 24 arrive at the same time, being triggered simultaneously, at the ends of the potentiometers 38 and 60 there will appear positive spikes, or positive square wave portions, negative spikes of negative square wave portions, or, if the positive and negative square waves from the circuits 22 and 24 respectively exactly counterbalance one another, no spikes, either positive or negative. This action is the result of the output of the Schmitt trigger subcircuit 26 which is dependent upon its input, in contrast to the output of the monostable multivibrator subcircuit 50 which is constant. If positive spikes result, they remain in the branch circuit 22, are inverted in the inverter subcircuit 64 thereof, and in that condition their output is fed into the first flip-flop subcircuit 44, the two transistors of which are both 2N1307 transistors. If, on the other hand, negative spikes result, these remain in the branch circuit 24 and their output beyond the diode 66 directly drives the second flip-flop subcircuit 56 of the branch circuit 24.

Connected to the emitter terminal of each of the 2N1307 transistors 45 and 57 of each side of each flip-flop subcircuit 44 and 56 respectively is the base of one of the pair of the 2N250 transistors 68 or 69 of the stepping motor subcircuit 58 or 59 respectively, the load of each transistor 68 or 69 constituting a winding 70 or 71 respectively of the stepping motor, generally designated 72. Thus, for each flip-flop subcircuit 44 or 56, there are two transistors 68 and 69 and two stepping motor windings 70 and 71. The pairs of transistors 68 and 69 and their corresponding stepping motor windings 70 and 71 provide means for switching the current necessary to drive the shaft 74 of the stepping motor 72 in one direction or the other, depending on whether the resultant spike is positive or negative. The stepping motor shaft 74 is operatively connected through suitable mechanism indicated by the dashed arrow 76, constituting a feedback loop, to the control member 78, such as the throttle, which regulates the speed of the motor shaft 14 or, in the case of a liquid flow control valve, the movable valve member of the valve.

The operation of the governor has been described in connection with its component parts and subcircuits above and is clarified by reference to the block diagram of FIGURE 2, which also shows the pulse shapes at various stages therein. Here it will be sufficient to say that if the engine shaft 14 rotates at the predetermined desired speed and remains constant at that speed, the positive and negative square waves emerging from the first and second branch circuits 22 and 24 cancel one another and no motion of the stepping motor shaft 74 results. If, on the other hand, the motor shaft speed 14 is in excess of the desired speed, the width of the positive square wave created in the first branch circuit 22 is overbalanced by the negative square wave of constant width in the second branch circuit 24, resulting in a negative spike or excess negative wave which causes the stepping motor shaft 74 to rotate in a direction which will actuate the mechanism 76 to operate the throttle 78 or other speed regulator, to slow down the speed of the engine and its output shaft 14. If, one the other hand, the speed of the shaft 14 is below the desired speed, the positive square wave created in the first circuit 22 overbalances the negative square wave created in the second circuit 24, whereupon the positive spike or excess positive wave operates the stepping motor 72 to rotate its shaft in the opposite direction, conveying this motion through the mechanism 76 to the throttle or other speed regulator 78 to cause the engine and its output shaft 14 to increase its speed. Thus, the digital electronic governor 10 of the present invention maintains the speed of the motor 14 at a substantially constant rate at the desired predetermined speed within the narrow limits specified above and within the capability of the intertia of the motor 14 to respond quickly to the operation of its control member 78.

What I claim is:
1. A digital electronic speed control governor for controlling the speed of a controlled apparatus having a speed-controlling regulator, said governor comprising
means associated with said apparatus and responsive to the speed thereof for generating an electronic pulse having a width proportional to said speed,
means for dividing the thus generated pulse into two pulse outputs, a variable width square wave branch circuit connected to one of said pulse outputs and effective to convert the received pulse into a square wave having a width varying in accordance with the variation of speed of the controlled apparatus,
a constant width square wave branch circuit connected to the other of said pulse outputs and effective to convert the received pulse into a square wave having a constant width proportional to the speed desired for the apparatus,
said branch circuits being connected in parallel relationship to one another,
means in one of said branch circuits for inverting the square wave produced by the pulse conversion action of said one branch circuit.
means for algebraically combining the opposite square waves emitted by said branch circuits to produce a resultant pulse,
a reversible stepping motor connected to said combining means to receive the resultant square wave increment therefrom and operatively responsive to said square wave increment, and feedback means responsive to the operation of said stepping motor for actuating the speed-controlling regulator of the apparatus to alter the speed thereof to said desired speed.

2. A digital electronic speed control governor, according to claim 1, wherein each of said branch circuits includes a flip-flop subcircuit.

3. A digital electronic speed control governor, according to claim 2, wherein said flip-flop subcircuit is a saturated flip-flop subcircuit.

4. A digital electronic speed control governor, according to claim 1, wherein said dividing means comprises a voltage divider.

5. A digital electronic speed control governor, according to claim 4, wherein a diode and phasing network is interposed between said voltage divider and each of said branch circuits.

6. A digital electronic speed control governor, according to claim 1, wherein said constant width square wave branch circuit includes a monostable multivibrator subcircuit.

7. A digital electronic speed control governor, according to claim 1, wherein said algebraic combining means includes a potentiometer in each branch circuit connected to receive the square wave output of the square wave converting subcircuit and a line extending between said branch circuits and interconnecting said potentiometers.

8. A digital electronic speed control governor, according to claim 1, wherein said stepping motor has four operating windings, two of said windings being connected to said variable width square wave branch circuit to receive the output therefrom and two of said windings being connected to said constant width square wave branch circuit for operating said stepping motor in one of two directions responsive to the opposing characteristic of said square wave increment.

9. A digital electronic speed control governor, according to claim 1, wherein said feedback means comprises mechanism operatively connecting said stepping motor to the speed-controlling regulator of the controlled apparatus.

References Cited

UNITED STATES PATENTS 3,184,606    5/1965    Ovenden et al. _____ 307—88.5
3,281,630   10/1966    Liang _____ 318—141 X MILTON O. HIRSHFIELD, *Primary Examiner.*

J. A. SILVERMAN, *Assistant Examiner.*